United States Patent [19]

Reymond et al.

[11] 4,193,689

[45] Mar. 18, 1980

[54] ARRANGEMENT FOR LOCATING RADIARING SOURCES

[75] Inventors: Jean-Claude Reymond; Jean-Luc Hidalgo, both of Paris, France

[73] Assignee: Thomson-CSF, Paris, France

[21] Appl. No.: 927,821

[22] Filed: Jul. 25, 1978

[30] Foreign Application Priority Data

Jul. 29, 1977 [FR] France .................. 77 23442

[51] Int. Cl.² ............................................. G01B 11/26
[52] U.S. Cl. ........................................ 356/152; 356/141
[58] Field of Search ............................... 356/141, 152

[56] References Cited

U.S. PATENT DOCUMENTS

| | | | |
|---|---|---|---|
| 3,375,375 | 3/1968 | Abbey et al. | 356/152 |
| 3,678,283 | 7/1972 | Labaw | 356/152 |
| 3,717,413 | 2/1973 | Kubo et al. | 356/152 |
| 3,917,412 | 11/1975 | Stoutmeyer et al. | 356/152 |
| 3,951,550 | 4/1976 | Slick | 356/141 |
| 4,028,725 | 6/1977 | Lewis | 356/152 |
| 4,039,825 | 8/1977 | Doyle | 356/152 |
| 4,092,072 | 5/1978 | Ellis | 356/152 |
| 4,111,555 | 9/1978 | Ellis | 356/152 |

*Primary Examiner*—S. C. Buczinski
*Attorney, Agent, or Firm*—Cushman, Darby & Cushman

[57] ABSTRACT

A sensor system for determining the spatial location of radiation relative to the sensor including three unit sensors each having a cylindrical optical lens and a linear array of photosensitive elements positioned in the focal plane at a fixed angle with respect to the longitudinal axis of the lens. Each lens determines substantially a plane of radiation passing through the source. The unit sensors are arranged to define three separate planes having the radiation source being detected as common point. The detected signals are processed to identify respectively the serial position of the elements activated by the focused radiation. Ancillary calculating means calculates the location of the source from the serial position information. By detecting a plurality of sources coupled to a movable body, the present invention enables the user to continuously determine the direction of a fixed axis of the movable body.

7 Claims, 6 Drawing Figures

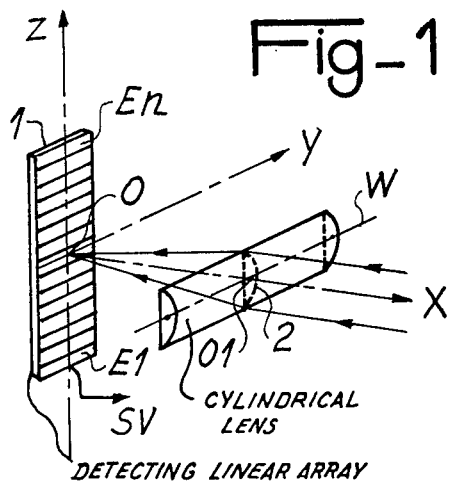
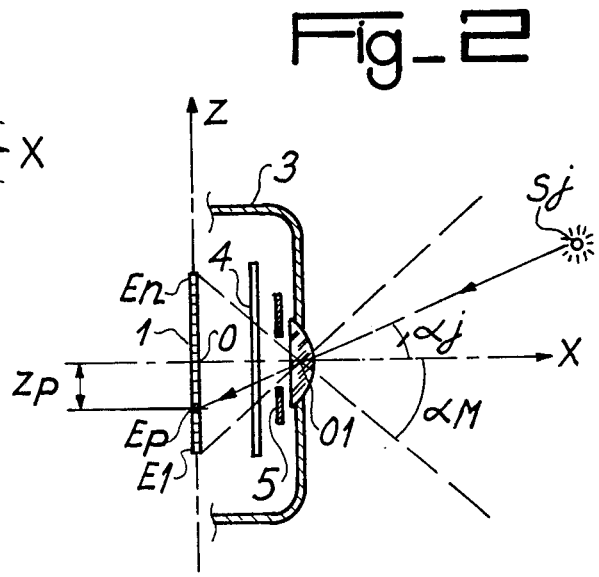
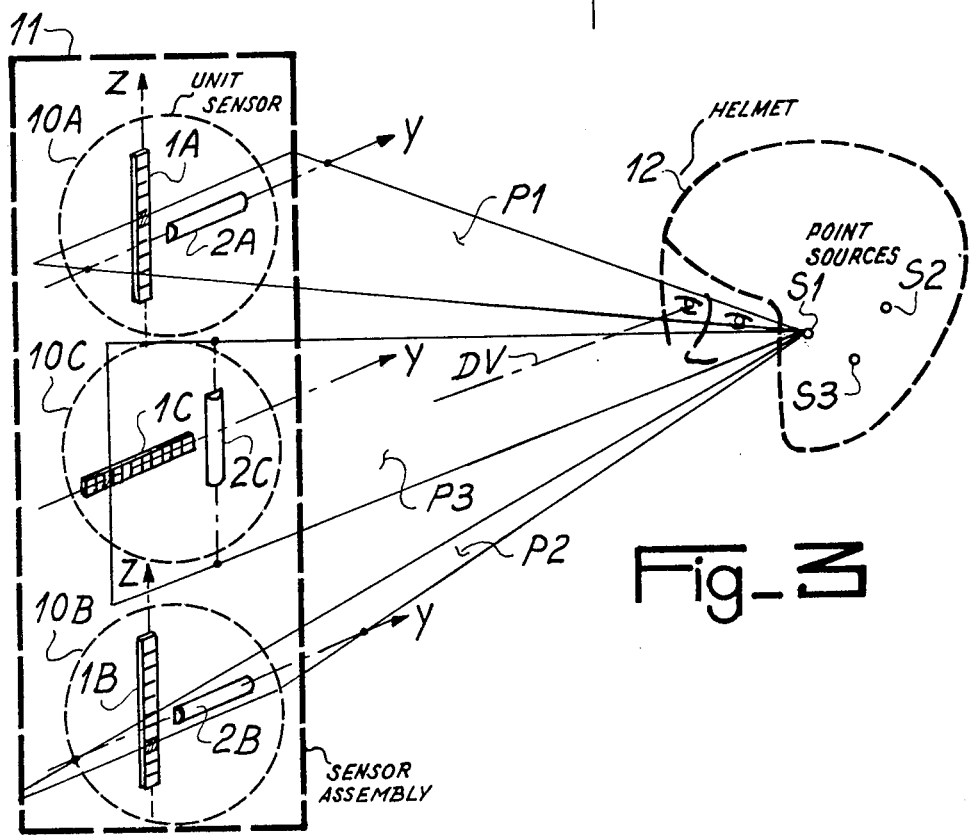

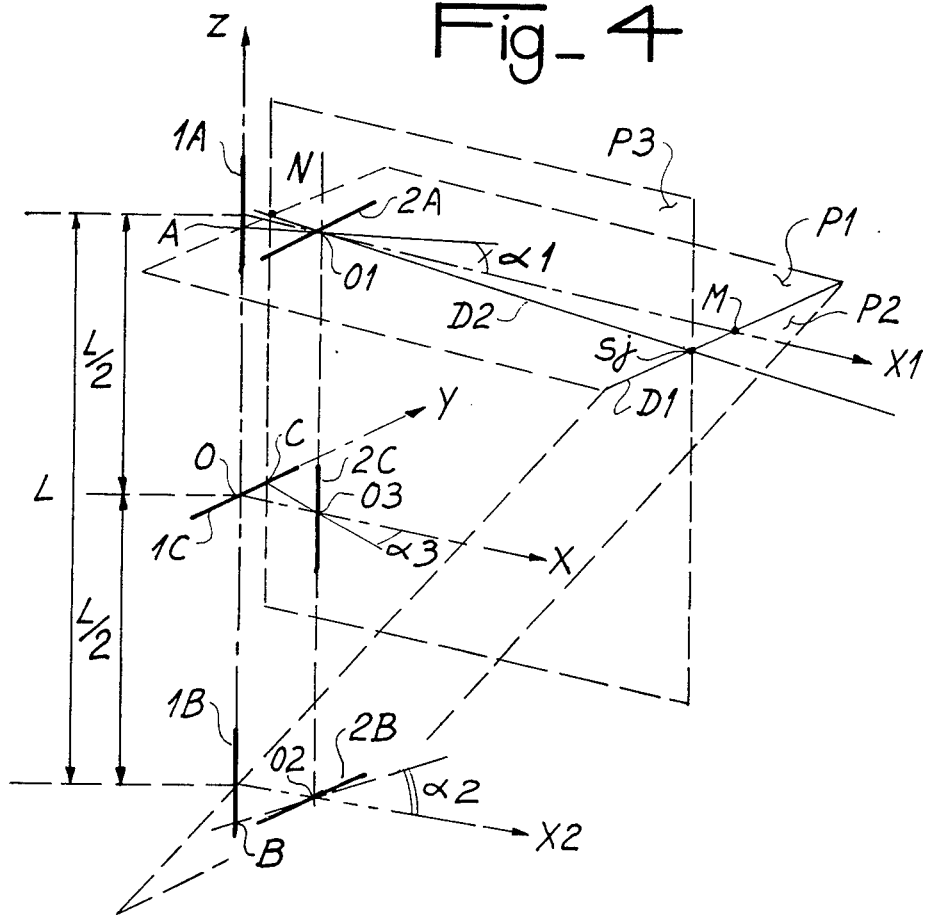
Fig_4
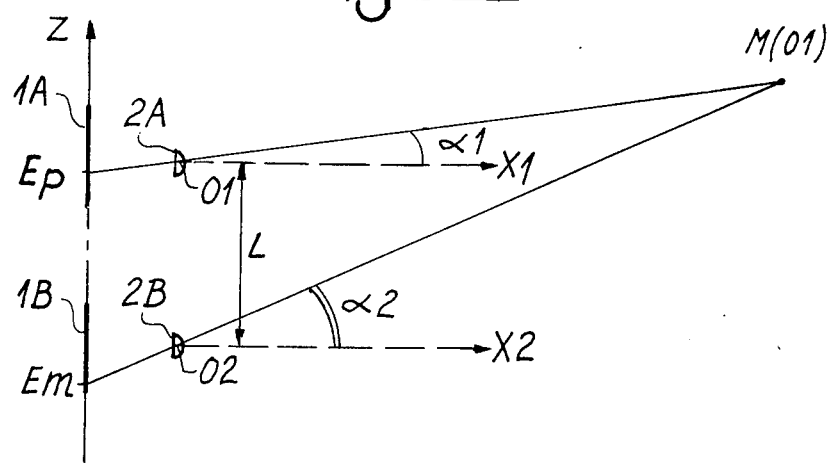
Fig_5

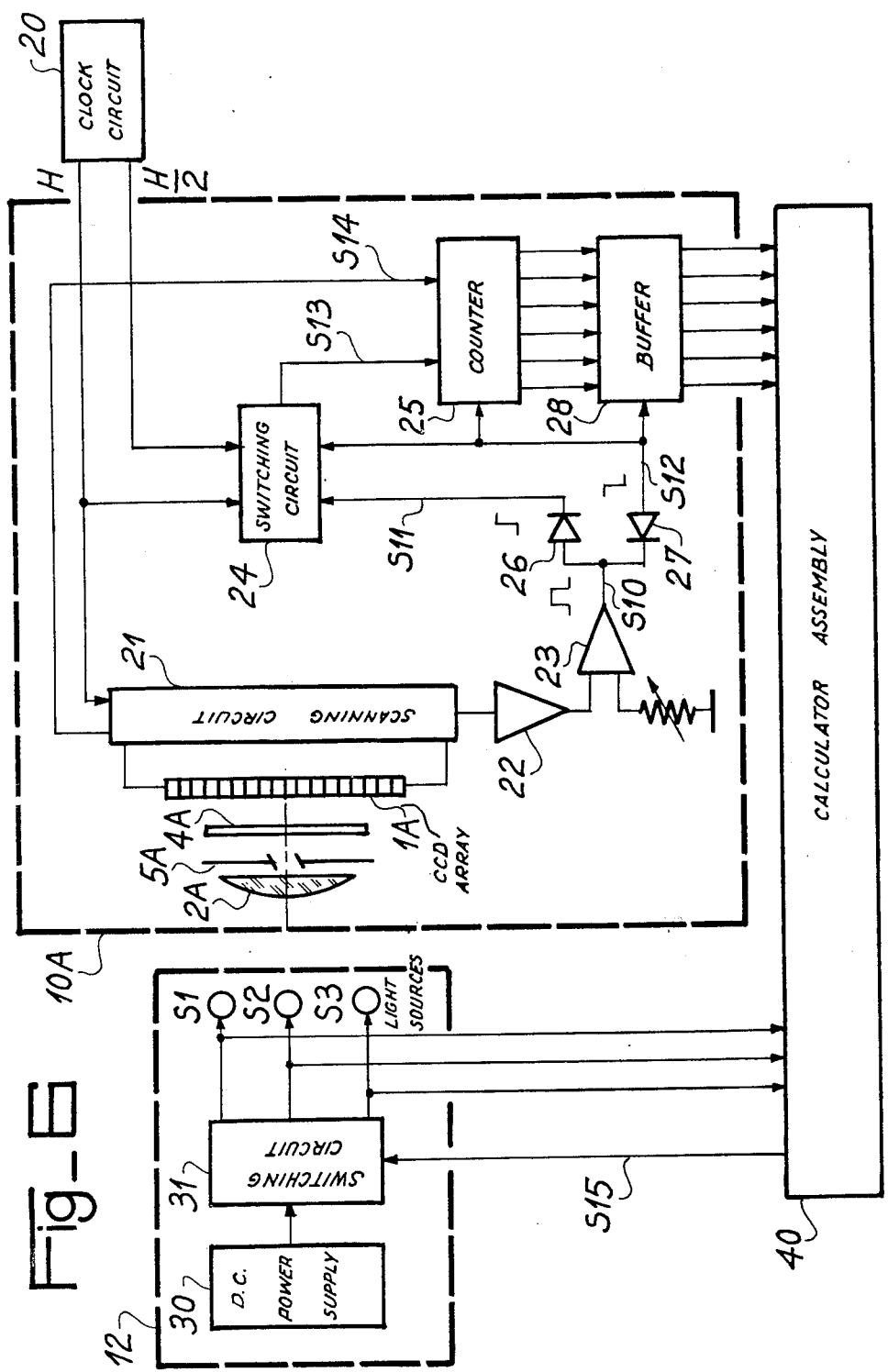
Fig_6

ARRANGEMENT FOR LOCATING RADIATING SOURCES

The present invention relates to systems for locating radiating sources and more particularly to direction finding systems.

It is sometimes useful to accurately determine the orientation of an axis with a certain degree of accuracy without the benefit of material contact with the axis.

A problem of this kind is encountered, in particular, in helmet-mounted sighting systems used in combat aircraft. The manner in which such a system operates will be briefly reviewed below. An ancillary collimator device enables the pilot to see an image of a reticle, which is projected to infinity and superimposed on the external surroundings, through a combining glass secured to the helmet which is inserted on one axis of monocular viewer. When the pilot wishes to designate a target in the observed scene, he lines up the reticle with the target and signals that it has been lined up by means, for example, of a push-button control provided for this purpose. Provided that the exact position of his helmet is known at the moment when the signal is given, it is then easy to determine the line of sight of the pilot in relation to the aircraft and to designate the target to a weapons system or to point an optical or other system in this direction.

The present invention enables a direction finding system to be produced which solves problems of this nature. The direction to be found bears a relationship to a free structure whose movements take place in a predetermined volume of space. In the preferred embodiment, this free structure is the helmet worn by a pilot and the volume of space is defined by the possible movements of the pilot's head within the cockpit. The direction finding arrangement includes a first part secured to the movable structure and a second part fixed to an external structure, the aircraft in the present case, to measure the angular movements of the movable structure relative to a system of reference axes related to the external structure. The direction finding arrangement thus enables the position of an object carried by the helmet of the pilot to be found from points which are fixed in relation to the aircraft and from there it is possible to determine to the line of sight by calculation. Since the helmet is worn by the pilot, it is important that the part of the arrangement which is fixed to the helmet be as light and uncumbersome as possible, and should so as to cause a minimum of danger.

Direction finding arrangements of this kind exist in various forms. With one known technique, the direction finding system comprises light-emitting diodes arranged on the movable structure such an arrangement might include for example three light-emitting diodes at the apex of a triangle, each diode emitting a wide beam of light, and on the external structure, a fixed detector arrangement made up of a mask and linear circuits consisting of photosensitive elements. The mask comprises two non-parallel slits which each define a transparent zone for transmitting input radiation to an associated detecting array. The diodes are supplied separately and sequentially so that they radiate in succession. In conjunction with the mask, each diode defines two planes which are secant and which intersect at a straight line passing through the emitting diode. The points at which these planes intersect with the linear detecting arrays enable the position of the common straight line in space to be calculated. In this way the detector arrangement enables light sources to be located angularly. The operation is performed for each diode and the corresponding three directions are determined by calculation and hence, the position of the diodes in space is determined, since the dimensions of the triangle are known, then the direction of the line of sight which bears a predetermined relationship to the triangle.

One object of the present invention is to provide a locating arrangement made up of simple items, which also employs a detector having a linear array of photosensitive elements but which enables more of the energy radiated by the source to be collected and hence the signal-to-noise ratio to be increased. Another advantage which will become apparent from the following description is due to the fact that, in a preferred embodiment, the detector arrangement enables the source to be located in space rather than simply in direction, that is to say angularly.

Another object of the present invention is to provide a direction finding system produced by combining the spacial locating arrangement with a group of point light sources fixed to the movable structure, such a combination enhancing the reliability and accuracy of measurements, given that each source can be located in space and that the known arrangement of the sources relative to one another allows additional checks to be made by calculation.

In accordance with the features of the present invention, there is provided an arrangement for locating radiating sources, comprising: a plurality of at least three sub-assemblies termed unit sensors, each such sensor including an optical device of the cylindrical lens type for focusing light radiation from a point source target and lying substantially in the plane passing through the source and the longitudinal optical axis of the lens, and a linear array of photosensitive elements positioned in the corresponding focal plane at a fixed angle with respect to said longitudinal axis, the unit sensors being arranged to define separate planes of optical reception; circuits for processing the detected signals of the detecting arrays to identify respectively the serial position of the elements activated by the focused radiation; and ancillary calculating means for calculating the spatial location of the source common to the planes from the identification.

Other features of the invention will be more apparent to those skilled in the art upon a consideration of the following description and accompanying drawings wherein:

FIG. 1 is a simplified diagram of a unit sensor belonging to the detecting arrangement, FIG. 2 is a diagrammatic centre-line cross-section through the unit sensor of FIG. 1, illustrating the function of angular location of a plane, FIG. 3 is a diagram of a preferred embodiment of a locating arrangement according to the present invention, to provide a direction finding system, FIGS. 4 and 5 are simplified diagrams relating to the operation of a source locating arrangement as shown in FIG. 3, and FIG. 6 is a diagram of an embodiment of the circuits involved in a system as shown in FIG. 3.

Referring now to the drawings, a locating arrangement according to the present invention includes at least three identical or similar sub-assemblies each employing a linear detector formed from photosensitive elements, such as a strip of CCD circuits or an equivalent device. Each sub-assembly is termed a unit sensor in what follows and is shown in simplified form in FIG. 1 by a strip 1 whose longitudinal direction is parallel to a first reference direction Z and by an optical element 2 of the cylindrical lens or equivalent type. The longitudinal axis W of the cylindrical lens is homologous to the optical centre in a sperical lens and is called the optical axis in what follows. This optical axis W is parallel to a second reference direction Y perpendicular to the previous direction Z. The photosensitive plane of the strip is parallel to the plane face of the lens, these planes being defined by the combination of the two cartesian directions Y and Z. The strip 1 is positioned in such a way as to be situated substantially in a focal plane approximated for the lens 2, at least in its central region which is positioned opposite the central part of the plane face of the lens. If the point O which is shown is the centre point of the strip in direction Z, the axis Y which is shown corresponds to the focal axis of the lens 2.

The operation of the unit sensor is illustrated by FIG. 2. Part of the omnidirectional radiation emitted by a point light source Sj situated on a movable structure reaches the lens in the form of rays parallel or substantially parallel to the direction of the source, which direction is indicated by the angle $\alpha j$. This incident radiation is focused by lens 2 on a point element Ep in the strip. Strictly speaking, in particular because of diffraction phenomena and the approximation involved in defining a focal plane for lens 2, there are generally a plurality of elements activated by the radiation, but a way of allowing for this is dealt with below. This problem will be explained below. For the sake of present discussion it will be assumed that only one element Ep is activated by radiation focused by lens 2. Element Ep is positioned at the intersection between direction Z and the plane defined by the source Sj and the optical axis W of lens 2. The distance Zp of element Ep along the Z axis is obtained by scanning the strip electronically and processing the signal SV which is obtained. The processing circuits include a calculator which enables the angle $\alpha j$ to be found which is formed by the said plane with the third reference direction X of a system of cartesian axes XYZ which is related to the external structure on which the sensor assembly is arranged. The item 3 which is shown represents a housing. An optical filter 4 is provided to filter the light radiation in a spectral wavelength band corresponding to the emission band of the sources provided, it being understood that the linear array 1 is also selected to suit the operating band. A diaphragm device 5 may also be incorporated in the assembly to define a viewing field whose angular width $2\alpha_M$ is sufficient to cover the volume in which the sources move.

Referring now to FIG. 3, there is shown a preferred embodiment of the locating arrangement according to the present invention combining three unit sensors, marked 10A, 10B and 10C respectively, of which the principal components are shown as in FIG. 1. The combination of three unit sensors enables three planes of location to be defined whose common point is the source radiating at the time concerned, such as source S1 from the group of three point sources S1, S2, S3. Since each plane is defined by the optical axis W of the corresponding element 2 and by the activated element Ep of the associated strip 1, calculation enables the position of the source S1 in space to be determined in relation to the selected system of axes XYZ which is related to the external structure 11 to which the sensor assembly is fixed. The same is then done for source S2 and then for source S3, which fixes the location of the triangle S1, S2, S3 and thus that of the movable structure 12 to which the sources are fixed. Since the direction of the axis DV to be found is precisely known by construction relative to the triangle S1, S2, S3, the desired information on direction is finally obtained.

In one possible lay-out, the unit sensors are arranged as shown, sensor 10B being displaced from sensor 10A by a translatory movement equal to L along axis Z and sensor 10C being arranged in a central position (equivalent to a translatory movement of L/2) and being rotated through $\pi/2$ around direction X. This arrangement is carried over to the simplified diagram of FIG. 4 together with the planes for locating a source Sj, the reasoning being the same for the other sources. The detector strips 1A, 1B, 1C are arranged in a first plane parallel to directions Z and Y, with 1A and 1B lying in direction Z and 1C in direction Y. The cylindrical lenses 2A, 2B, 2C are arranged in a second plane parallel to the first, with 2A and 2B lying in direction Y and 2C in direction Z. The locating planes are marked P1, P2 and P3 and the angles formed with direction X are marked $\alpha 1$, $\alpha 2$, and $\alpha 3$, respectively. The unit sensors 10A and 10B enable the two planes P1 and P2 to be defined, these planes intersecting at a straight line D1 parallel to the direction Y of the optical axes of elements 2A and 2B. If reference is made to the partial transverse centre-line view in FIG. 5, it can be seen that, if the distance L separating elements 2A and 2B and the angular parameters $\alpha 1$ and $\alpha 2$ are known, it is possible to calculate all the elements of the triangle 01, 02, M in the plance of the figure and thus to obtain the position of the straight line D1, 01 and 02 and M being the points at which the optical axis and the straight line D1 are respectively cut. The third unit sensor 10C determines the angular direction $\alpha 3$ relative to X of the plane P3 passing through the optical axis of element 2C. This plane cuts the straight line D1 at the point source Sj. The co-ordinates of point Sj are obtained by calculation. The vector equation $\overline{S3S1} + \overline{S1S2} + \overline{S2S3} = 0$ for the triangle and a knowledge of the length of each of these vectors enables an additional check to be performed by calculation, of a kind intended to increase the reliability and accuracy of measurement. A, B and C being point situated on the strips and 01, 02 and 03 being the centre points of the optical axes, there are given below, by way of example, the equations for the planes, taking the centre point of the strip 1C of the intermediate sensor 10C as the origin O of the axes:

plane P1: $(z1 - ZA)x + zA \cdot x1 = x1 \cdot z$
plane P2: $-yB \cdot x + yB \cdot x1 = x2 \cdot y$
plane P3: $(z3 - zC)x + zC \cdot x1 = x3 \cdot y$
with A (O, O, zA), B (O, yB, O), C (O, O, zC), O1 (x1, O, z1), O2 (x2, O, O), O3 (x3, O, z3).

Point Sj (xS, yS, zS) satisfies these three equations. If the optics are identical, by assuming $x1 = x2 = x3 = f$ (focal length) and by assuming that $z1 - z3 = L$ (the distance between O1 and O3) the following simple equations are obtained:

$$xS = (zC - zA) \cdot \frac{f}{L + (zC - zA)}, \quad yS = \frac{L \cdot yB}{L + (zC - zA)}$$

and $$zS = \frac{L \cdot zA + zI(zC - zA)}{L + (zC - zA)}$$

The locating arrangement may be produced in a simpler form using two unit sensors rather than three, although it should be noticed that with the two sensor arrangement, the location of the source becomes directional or angular rather than spatial and that the accuracy of measurement is reduced. There are used for this purpose two unit sensors whose positions differ, such as sensors 10C and 10A or sensors 10C and 10B.

FIG. 6 shows, in the form of a diagram, an embodiment of the electronic circuits involved in the direction finding system. For reasons of simplicity only one unit sensor 10A has been show. Synchronizing means common to all the unit sensors are provided by a clock circuit 20 which emits a pulsed signal of frequency H and a signal of half the frequency H/2. Signal H synchronizes the circuit 21 for scanning the photosensitive strip 1A of CCD circuits. For convenient construction, elements 21 and 1A can be formed as integrated circuits on the same substrate. The output signal SV is amplified at 22 and its level is detected by comparison with a threshold at 23. Via a switching circuit 24, signal H drives a counter 25. The leading edge S11 of the useful signal S10 from the output of the comparator 23 is selected by a diode 26 and transmitted to switch 24 to bring about changeover between counting frequencies at this moment, by replacing signal H by signal H/2 at the output S13 of the switch 24. The trailing edge S12 of the useful signal S10 is selected by a second diode 27 and on the one hand operates switch 24 to select signal H again and on the other hand operates counter 25 to stop the count. In addition, signal S12 causes the result of counting to be transferred to a buffer register 28. When the whole of the row of elements El to En making up the strip 1A has been scanned, circuit 21 emits an end-of-scan signal S14 which resets counter 25 to zero. A fresh scanning cycle then takes place under the same conditions for the next source. The procedure which is adopted enables the central activated element Ep to be identified, given that the spot of light focussed on the strip generally covers a plurality of photosensitive elements.

The part associated with the movable structure comprises a DC power supply circuit 30 and a switching circuit 31. A calculator 40 receives the counting data from the buffer store 28 and then emits a signal S15 to operate the switch 31 to switch the power supply to the next source. Each supply output to the light sources S1 to S3 is also connected to the calculator 40 to provide an address, that is to say to identify the source currently operating. It will be noted that the synchronising means 20 may be assumed to be included in the calculator assembly 40.

The number of light sources may be three per group as shown in FIG. 3 but this does not rule out the possibility of using a larger number. For the intended application to a helmet sight, the components may be distributed as follows: two groups of three light-emitting diodes, one to the right and the other to the left of the helmet, and similarly two sensor assemblies, one to the right and the other to the left of the pilot situated towards the front of the cockpit. Two of the three diodes in each group may be arranged parallel to the reference direction DV but this is not essential. The switching of the diodes may for example take place at a frequency of 50Hz, using diodes modulatable at high speed and having a rise time of less than 1 ms. The fact of emitting a broad beam, if possible one covering close to $2\pi$ steradians, allows the pilot's head to make rotary movements which are large, since they are of the same order. In addition, the emission is selected to be in a non-visible range in order not to trouble the pilot with interference reflection, the range selected preferably being in the infra-red in view of the fact that CCD circuits exist which are highly sensitive in this wavelength band. Under the above mentioned conditions, the CCD strips are interrogated periodically in the cause of scanning period of less than 2 ms. The number of photosensitive elements in a strip may be very high, in the order of 1700 for example. The cylindrical optic 2 is of small dimensions, having for example an axial length of the order of 20 mm and a focal length of 15 to 20 mm and an aperture of 3 to 5 mm.

The direction finding arrangement which has been described is capable of many modifications lying within the scope of the present invention, which may be achieved in particular by increasing the number of diode groups and/or that of the sensors which operate in association. A particularly useful modification of this kind consists in using each group of diodes in association with two sensor assemblies each formed by at least three unit sensors. Knowing the relative positions of the two sensor assemblies, the assemblies being at a distance L1 from one another in direction Z for example, the calculator, by a suitable triangulation based on a source and the two sensor assemblies, is able to refine the measurement given by each sensor assembly.

The embodiment according to FIG. 3 is preferred to obtain simple equations to resolve, nevertheless it will be understood that the angle between the direction of the optical axis of the lens and the direction of the associated detection strip is not limited to the value considered and that the strips of the sensor assembly may be arranged in different planes.

It is also understood that the optical device of a unit sensor may be produced with a conventional optic such as the plano-convex cylindrical lens 2 which is shown or may be formed by a group of optical lens constituting an equivalent optical device.

When combined with a plurality of point sources, the locating arrangement which has been described enables the direction of one axis of the movable structure carrying the sources to be found.

What is claimed:

1. A sensor system for the spatial location of radiation sources comprising:
   first, second and third unit sensors, each such unit sensor including:
      an optical device of the cylindrical lens type for focusing light radiation incoming from a point source defining a plane of reception of said light radiation passing through said source and the longitudinal optical axis of said optical device, and
      a linear array of photosensitive elements for developing detection signals responsive to said light radiation, said elements positioned in the corresponding focal plane of said optical device at an angle with respect to said longitudinal axis,
   said first, second and third unit sensors having arrays arranged in a plane, the arrays of said first and second sensors being aligned in a first cartesian reference direction and the array of said third sensor being oriented in a second cartesian reference direction and situated between said first and second unit sensors, circuit means for processing said detection signals of said detecting arrays to identify respectively the rank position of the elements activated by said radiation; and ancillary calculating means for calculating the spatial location of said source common to said planes from the identification.

2. A sensor system according to claim 1, wherein for each unit sensor the array is arranged with an orientation orthogonal to that of the longitudinal axis of the associated optical device.

3. A sensor system according to claim 1, wherein each unit sensor includes an optical filter for filtering the radiation from said source, which is intended to lie in a predetermined spectral band.

4. A sensor system according to claim 1, wherein said array of photosensitive elements includes CCD circuits and wherein for each unit sensor, said processing circuits comprise:

a counting circuit for counting synchronizing pulses which are used for the scanning of the array in order to bring about the identification of rank position, a threshold comparison circuit for detecting the level of the detected signals, a first detection circuit fo selecting the leading edge of said detected signal, and a second detection circuit coupled in parallel with said first detection circuit for selecting the trailing edge of said detected signal, the leading edge signal operating a switching circuit which receives said synchronizing pulses and a second signal of half the frequency to change over the counting frequency, the trailing edge signal causing the count to stop so that the result of counting will correspond to the serial position of the center one of the activated elements.

5. A sensor system according to claim 1, including two detection assemblies arranged at a predetermined distance from one another in a cartesian reference direction to define a triangle with a point source to localize each detection assembly comprisng three unit sensors.

6. A sensor system for the spatial location of radiation sources comprising:

first, second and third unit sensors, each such unit sensor including:

an optical device of the cylindrical lens type for focusing light radiation incoming from a point source defining a plane of reception of said light radiation passing through said source and the longitudinal optical axis of said optical device, and a linear array of photosensitive elements for developing detection signals responsive to said light radiation, said elements positioned in the corresponding focal plane of said optical device at an angle with respect to said longitudinal axis, said first, second and third unit sensors having arrays arranged in a plane, the arrays of said first and second sensors being aligned in a first cartesian reference direction and the array of said third sensor being oriented in a second cartesian reference direction and situated between said first and second unit sensors;

circuit means for processing said detection signals of said detecting arrays to identify respectively the rank position of the elements activated by said radiation, said circuit means for processing including:

a counting circuit for counting synchronizing pulses used for the scanning of the array in order to bring about the identification of rank position, a threshold comparison circuit for detecting the level of the detected signals, a first detection circuit for selecting the leading edge of said detected signal, and a second detection circuit coupled in parallel with said first detection circuit for selecting the trailing edge of said detected signal, the leading edge signal operating a switching circuit which receives said synchronizing pulses and a second signal of half the frequency to change over the counting frequency, the trailing edge signal causing the count to stop so that the result of counting will correspond to the serial position of the center one of the activated elements; and ancillary calculating means for calculating the spatial location of said source common to said planes from the identification.

7. A sensor system according to claim 6, wherein said arrays of photosensitive elements include CCD circuits and wherein each array is arranged with an orientation orthogonal to that of the longitudinal axis of the associated optical device.

* * * * *